Jan. 27, 1959   O. P. RICHTER   2,871,053
PNEUMATIC HOLDING DEVICE
Filed March 14, 1956   2 Sheets-Sheet 1
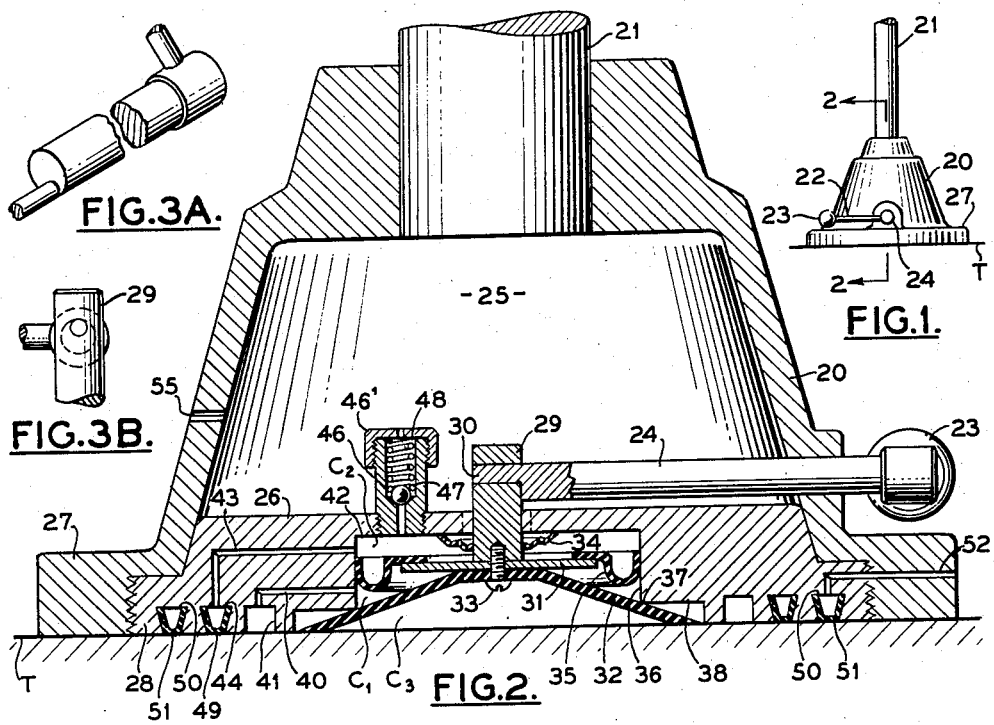
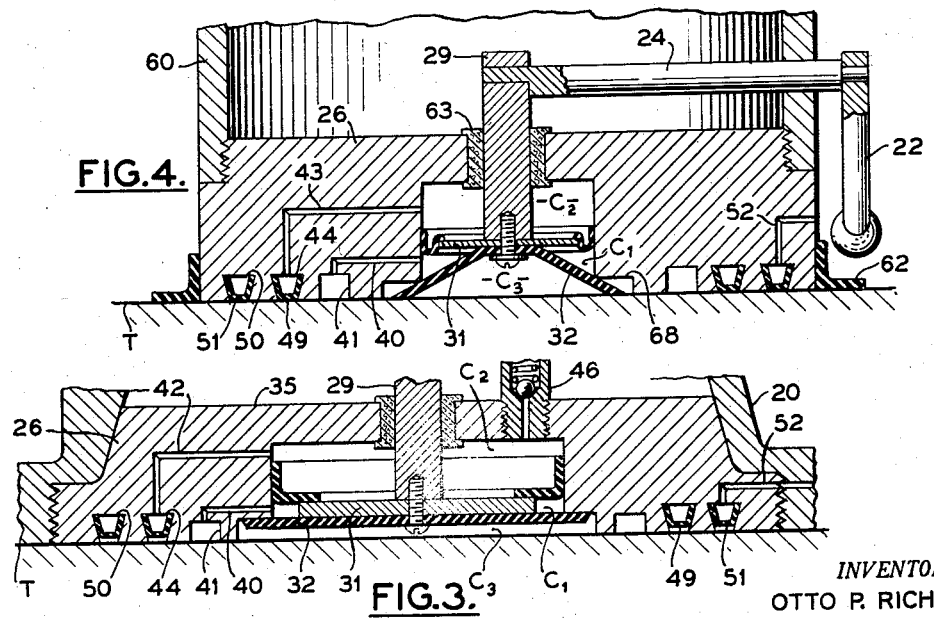
INVENTOR.
OTTO P. RICHTER
BY J. B. Burke
ATTORNEY

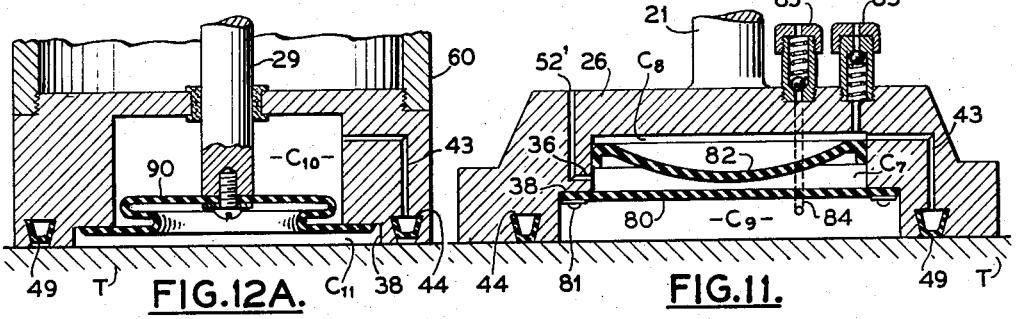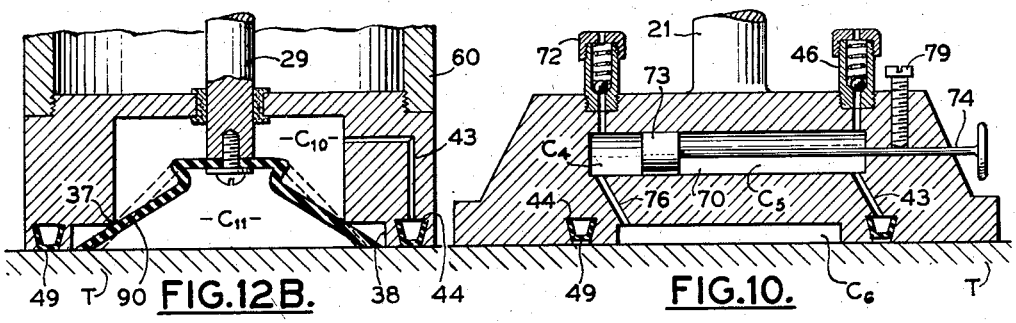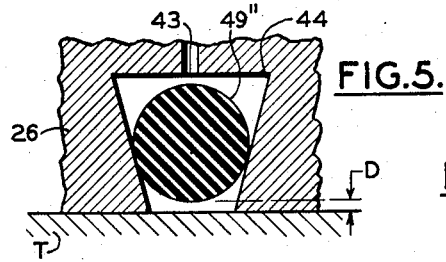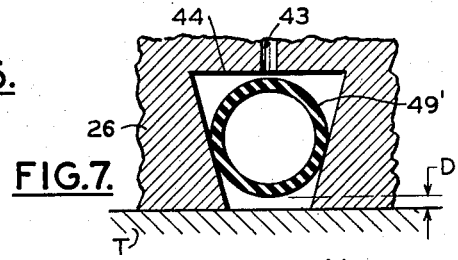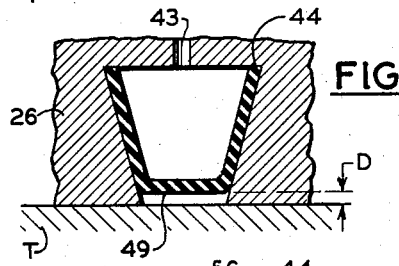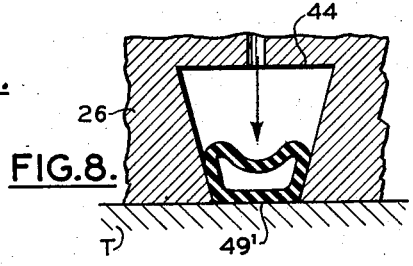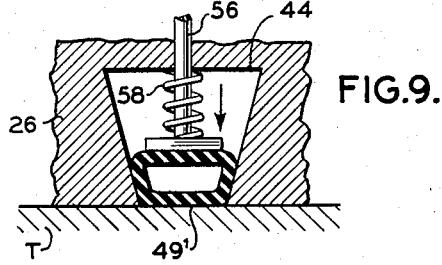
INVENTOR.
OTTO P. RICHTER
BY J. B. Burke
ATTORNEY

United States Patent Office 2,871,053
Patented Jan. 27, 1959

2,871,053

PNEUMATIC HOLDING DEVICE

Otto P. Richter, Hollis, N. Y.

Application March 14, 1956, Serial No. 571,517

10 Claims. (Cl. 294—64)

This invention concerns a pneumatic holder and particularly concerns a holding device for measuring instruments, tools and the like on smooth, flat surfaces.

The holding device according to the present invention is adapted for supporting single or multiple upright posts, hollow columns, angle bars and plates, parallel bars, etc., in a fixed position on a smooth flat surface of metal, stone, wood, and so on. Since the device operates pneumatically it avoids the objectional features of magnetic holding devices of known types. Such magnetic devices are only adapted for use on steel surfaces against which the magnets are effective. They cannot be used on any non-magnetic surface. When in use such magnetic holding devices shed magnetic particles when they are moved over or removed from a steel work surface. This is very objectionable in highly critical measuring operations.

The holding device may be caused to adhere to a horizontal, vertical or inclined flat surface. The device may be supported in a horizontal, vertical, or inclined position. The device may even be attached in an up-side down position to a flat supporting surface. In one such use the device serves as a support for non-magnetic articles to be ground in a surface grinder.

It is therefore a principal object of the present invention to provide a pneumatic holding device for a tool, or gauge, or for articles being worked upon.

It is a further object to provide a manually operated pneumatic holding device which operates by suction to adhere to a smooth flat surface.

It is a further object to provide a pneumatic holding device provided with one or more resilient sealing rings to retain the suction by which the device adheres to a flat surface.

It is a further object to provide a pneumatic holding device having a flat base with a cavity containing a suction diaphragm, and with one or more suction grooves surrounding the cavity.

Other and further objects and advantages of the invention will become readily apparent from the following description taken together with the drawings, wherein:

Fig. 1 is an elevational view of a tool or gauge supporting device embodying the invention.

Fig. 2 is a longitudinal sectional view taken on lines 2—2 of Fig. 1.

Fig. 3 is a view corresponding to Fig. 2 of a portion of the device with members in a released condition.

Fig. 3A is a perspective view of a portion of the operating handle and a shaft used in the device. Fig. 3B is an end view of the shaft.

Fig. 4 is a vertical sectional view of a modification of the invention.

Figs. 5, 6, 7 are vertical sectional views on an enlarged scale of various sealing means for an air channel used in the device.

Fig. 8 shows the sealing means of Fig. 7 in a collapsed or stressed condition.

Fig. 9 shows the sealing means of Fig. 6 actuated by mechanical means.

Figs. 10 and 11 are vertical sectional views of further modifications of the invention.

Figs. 12A and 12B are vertical sectional views of another modification of the invention showing the device in both adhering and non-adhering conditions.

The holding device shown in Fig. 1 has a base 20 which may be an upright tapering member. The base may be circular, square, oval, rectangular, or have any other suitable shape, circumferentially. A post 21 is supported in a fixed position centrally on the base 20. A handle 22 is provided for manually operating the device. The handle has an enlarged weighted ball end 23. The handle is attached to a shaft 24 which is better shown in Fig. 2 along with details of internal construction of the device. The device is adapted for adherence by suction to the flat smooth surface T of any type of support. While the supporting surface T is shown horizontal, this is not essential to the operation of the device since the device will adhere to vertical and inclined flat surfaces also.

In Fig. 2, the base 20 is shown as a hollow member beneath the post 21. In the cavity 25 thereof is secured a base block 26. The block has a lower flat surface which rests on the flat surface T. Base 20 has a flange 27 which also has a flat surface bearing on the surface T. A threaded flange 28 serves as a convenient means of attaching the base block 26 to the base 20 if the block is circular. If the block is square, oval, rectangular or has some other shape it may be secured in or to the base 20 by screws or other suitable means. If the block 26 has a threaded flange it may be screwed into a threaded recess in the base 20. Centrally disposed in the base 26 is a short shaft 29. This shaft has an aperture in which is disposed the eccentric cylindrical extension 30 of shaft 24. At the lower end of shaft 29 is secured by screw 33 a metal disk or diaphragm and a stiffly resilient rubber disk or membrane 32. The several disks are disposed in a cylindrical recess or cavity in the base block. This recess has a wall 36 and a top wall 42. A corrugated circular annular bellows member 34 insures a complete air seal between the shaft 29 and the recess since it is attached between the shaft 29 and the wall 42. A similar bellows member or an annular resilient rubber ring 35 forms an effective air seal between disk 31 and the wall 36 of the recess. The wall 36 is undercut to form a recess 38 having a flat upper annular wall and a circular corner rim 37. The disk or membrane 32 extends into this recess. The diameter of membrane 32 is slightly less than the greater diameter of the recess 38. The margin of the membrane firmly and snugly abuts the flat upper wall of the recess 38 when the disk is in unstressed condition as shown in Fig. 3. The disks 31 and 32 define a closed cavity or chamber $C_1$ with wall 36. From this cavity a bore 40 in block 26 leads to an endless groove 41 at the bottom of the block. This groove may be circular, square, oval, rectangular or have any other shape circumferentially. The groove 41 surounds the central recess in the block. Another closed space, chamber, or cavity $C_2$ is defined between disk 31, the top wall 42, and wall 36. A bore 43 provides a passage leading from cavity $C_2$ to an endless groove 44 disposed near and surrounding groove 41. A valve 46 having a cap 46' is mounted in the top of the block and opens into cavity $C_2$. This valve has a central channel normally held closed by a ball 47 biased by a spring 48. A resilient endless rubber ring 49 is disposed in the groove 44. This ring may be U-shaped in cross section as shown on an enlarged scale in Fig. 6. Other possible shapes for the endless ring are the hollow tube 49' of Fig. 7 or the solid circular ring 49" with round cross section shown in Fig. 5. Another endless groove 50 in the base of the block surrounds groove 44. An endless resilient ring 51 is disposed in this groove also. A bore 52 defines a passage extending from groove 50 through the block 26 and flange 27 to the outside atmosphere. Another bore 55 extends through the wall of base 20 so that cavity 25 is maintained at atmospheric pressure. A cavity $C_3$ is defined between surface T and the membrane 32. The several endless rings 49 and 51 have thin flexible rubber walls which are cemented to the sides of the grooves. The sides of the grooves taper downwardly to form small narrow endless openings at the bottoms thereof. When in an untensioned condition, the bottoms of the sealing rings are elevated above the bottoms of the grooves the distance D as best shown in Figs. 5, 6, and 7. This distance is about one sixteenth of an inch. This feature is important because it enables the device to be lifted and moved freely over surface T. If the rings were initially flush with surface T this freedom of movement would not be possible. The cavities of chambers $C_1$, $C_2$, and $C_3$ are all initially at atmospheric pressure.

The operation of the device will now be described. Initially the shaft 29 is in a lowered position as shown in Fig. 3. The membrane 32 is substantially flat and its upper surface is firmly juxtaposed to the upper wall of recess 38 so that cavity $C_3$ occupies a minimum volume. The bottoms of the rings 49 and 51 are located the distance D above surface T. The handle 22 may have a marking on it to indicate the device is in non-adhering condition. Now when the handle 22 is turned, shaft 24 also turns and lifts shaft 29 which causes the membrane 32 to assume the generally conical configuration shown in Fig. 2. The rim of the membrane 32 now abuts surface T since it pivots on the circular rim 37 of recess 38. As the shaft 29 is lifted, the closed chamber $C_3$ under membrane 32 is enlarged so that the air pressure therein drops causing the base 20 to be pressed down and adhere to surface T by the pressure of the atmosphere thereon. While the shaft 29 is being lifted, chamber $C_1$ becomes enlarged and a suction is created in channel 40 and groove 41. This groove now provides a buffer ring surrounding chamber $C_3$ so that if any air should somehow enter beneath the base 20 and block 26 it must first raise the pressure in groove 41 before it can affect the suction in chamber $C_3$. The air in cavity $C_2$ becomes compressed with the diaphragm 31 raised. The excess of pressure therein is relieved through valve 46, so that the pressure in the cavity now is equal to atmospheric pressure plus the pressure bias of spring 48. The ring 49 is forced down on surface T by this increased pressure in cavity $C_2$. The ring 51 is also forced down on surface T as air tends to enter the bore or passage 52 to overcome the suction under membrane 32 and disk 31. There now exists a plurality of sealing rings around the cavity C. Membrane 32 is sealed at its rim on surface T and on its exterior at the circular corner 37. Rings 49 and 51 provide two additional air seals. The flat bottom surface of flange 27 on surface T provides another air seal. The groove 41 provides the buffer zone. If air from the outside should tend to "creep" or find its way past the three sealing rings defined by flange 27, and rings 49 and 51, it must first neutralize or raise the pressure in groove 41 and chamber $C_1$ before it can reach chamber $C_3$ where maximum suction exists. The weight of ball 23 and handle 22 keep the shaft 29 elevated with membrane tension as shown in Fig. 2. If desired the handle 22 may be marked to indicate that the device is now under suction and adhering to surface T.

In Fig. 4 is shown a modification of the invention, in which a cylindrical pipe or sleeve 60 is threaded to and supported on block 26. Shaft 29 is sealed to the block by a packing ring 63. A circular sealing ring 62 is disposed at the base of the block on surface T.

The operation of the device in Fig. 4 is similar to that of Fig. 2. By turning handle 22, the shaft 29 is elevated and lowered as required to secure the device pneumatically to surface T and to release it as required. In this embodiment, the exterior ring 62 is an additional sealing member.

In Fig. 7 the tube 49' is shown in an expanded condition and in Fig. 8, the tube 49' is shown in collapsed condition as it would be in groove 44 or 50 when placed under pressure. In Fig. 9 the tube 49' is shown pressed down mechanically by a rod 56 having a plate 57 at the end thereof. The rod 56 may be attached to shaft 29 or shaft 30 by suitable gearing not shown so that the plate 57 is pressed down on the tube 49' when the shaft 29 is elevated. If desired a spring 58 may be provided to assist in elevating the rod and plate when handle 22 is turned to lower membrane 32 and release the device from surface T. When rod 56 is provided it may be possible to omit bore 43, or if the rod is used in groove 50, then bore 52 may be omitted. In Fig. 5 the ring 49'' is shown as a solid structure as contrasted with the hollow form of ring 49' and the U-shape of ring 49.

In Fig. 10 is shown a pneumatic holding device in which the base block 26 has a cylindrical cavity 70 into which open two valves 72 and 46, at opposite ends of thereof. A piston 73 is manually movable by a handle 74 in the cavity. Piston 73 divides the cavity into two spaces $C_4$ and $C_5$. A bore 76 leads from one end of cavity 70 into a lower recess or cavity $C_6$. Bore 43 at the other end of the cavity leads into groove 44 in which is a sealing ring 49. In operation the handle 74 is initially fully inserted in cavity 70 reducing cavity $C_4$ to substantially zero. All other cavities are at atmospheric pressure. When the handle is drawn out, a reduced pressure and suction develops in cavity $C_6$. Air under pressure is expelled from valve 46 and the residual pressure in cavity forces ring 49 down on surface T to seal the groove 44 to surface T. Screw 79 serves to secure the handle in any desired position. If after a period of time air should enter cavity $C_6$ to increase the pressure therein, the screw may be released and the handle 74 drawn further out of the device to restore the original suction. Valve 72 serves as air pressure release member when the handle is initially fully inserted in cavity 70.

In Fig. 11 is shown a pneumatic holding device in which a rigid disk 80 is secured by rivets 81 to the upper wall of recess 38. A resilient membrane 82 is sealed to wall 36 in the block. The disk and membrane form cavities $C_9$, $C_7$, and $C_8$. A valve 83 is mounted on the block and a bore 84 is provided with an opening into cavity $C_9$ from the valve. Another valve 85 opens into cavity $C_8$. A bore 43 leads through the block from cavity $C_8$ to groove 44 at the base of the block. Resilient sealing ring 49 is disposed in the groove. A bore 52' extends from cavity $C_7$ through the wall of the block to the atmosphere.

To operate the device of Fig. 11, an air pump (not shown) may be connected to valve 85 to pump air into cavity $C_8$ and increase the pressure therein. A vacuum pump will be connected to valve 83 to draw air out of cavity $C_9$ and establish a suction therein. The increased pressure in cavity $C_8$ causes air pressure to increase on ring 49 to provide an air seal at the base of the block. If any air enters chamber $C_8$ over a prolonged period of time, the suction may be restored by reapplication of the vacuum pump to valve 85. Application of the air pump to valve 85 will restore the air pressure therein if air should somehow leak out of groove 44. Since the membrane 82 is under tension it will take considerable time however before the air pressure in chamber $C_8$ is lowered enough to significantly release sealing ring 49.

In Figs. 12A and 12B is shown a pneumatic holding device in which suction is maintained automatically for an extended period of time. A stiff but resilient cup-like membrane 90 is attached to shaft 29. The end of the membrane abuts the upper wall of recess 38. A bore 43 extends from the annular groove 44 through block 26 into cavity $C_{10}$. A closed cavity $C_{11}$ is formed between membrane 90 and the flat surface T. The membrane is tensioned so that it tends to straighten out and assume the dotted line position shown in Fig. 12B. Fig. 12A shows the initial position of the shaft 29 with atmospheric pressure in both chamber $C_{10}$ and $C_{11}$. When shaft 29 is lifted by any suitable means such as the mechanical arrangement of Fig. 2, the membrane unfolds partially enlarging cavity $C_{11}$ and establishing a suction there, while cavity $C_{10}$ is diminished increasing the pressure on ring 49 in groove 44. Three sealing zones exist. The rim of the membrane 90 abutting the surface T is one such zone. The contact of the side of the membrane with the corner 37 of recess 38 is another sealing zone, and ring 49 defines another sealing zone. Now if air tends to enter and increase the air pressure in chamber $C_{11}$, the side wall of membrane 90 will tend to straighten out and enlarge the chamber $C_{11}$ so that the suction is restored and maintained, while pressure on ring 49 will be further increased because of an increase in pressure in chamber $C_{10}$ due to its reduced size.

Instead of the eccentric element 30, a suitable gear train, system of levers or other mechanical arrangement may be used to elevate the shaft 29 on operation of the handle 22.

The invention is not restricted to the particular examples described but may have any other of a variety of forms and modifications as defined by the scope of the appended claims.

What is claimed and sought to be protected by Letters Patent of the United States is:

1. A pneumatic holding device, comprising a block having a rigid flat bottom surface for contacting a flat support, said block having a cylindrical cavity therein open at one end at the bottom of the block, said block having an endless groove open at the bottom of the block and surrounding said cavity, a resilient ring retained in and sealing said groove against flow of air past the ring, said ring being normally spaced inwardly from the bottom of the block, said cavity having an undercut wall forming a cylindrical recess, a stiffly resilient membrane extending across the cavity and having its rim projecting into the recess and bearing on said wall, and means supporting said membrane in an unstressed condition away from the bottom of the block in said cavity to divide the cavity into upper and lower compartments, said block having a passage formed therein connecting said groove with the upper compartment, said means being operative to stress said membrane and pivot said rim on said wall for enlarging the lower compartment while diminishing the upper compartment to effect a hermetic seal under suction of the lower compartment on said flat support, said ring being forced outwardly to press against said flat support by pressure of air applied through said passage from the diminished upper compartment to provide a further hermetic seal on said support.

2. A pneumatic holding device according to claim 1 wherein said groove has sides inclined with respect to said bottom surface for retaining said ring in the groove.

3. A pneumatic holding device according to claim 2 wherein said ring is generally U-shaped in cross section with the bight of the ring exposed at the bottom of the block.

4. A pneumatic holding device according to claim 2, wherein said ring is a hollow tube.

5. A pneumatic holding device according to claim 2, wherein said ring is a solid torus.

6. A pneumatic holding device according to claim 1, further comprising a shell overlying said block and removably secured thereto, and tool holding means supported by said shell.

7. A pneumatic holding device, comprising a block having a rigid flat bottom surface for contacting a flat support, said block having a cylindrical cavity therein open at the bottom of the block, said cavity having a wall undercut to form a recess with an inner circular corner rim, said block having a plurality of grooves open at the bottom of the block and surrounding said recess, a resilient ring disposed in and sealing each of said grooves against flow of air past the ring, each ring being normally spaced inwardly from the bottom of the block, a stiffly resilient membrane extending across the cavity and having its outer edge normally supported in said recess adjacent said rim, and means supporting said membrane in an unstressed condition away from the bottom of the block in said recess to divide the cavity into upper and lower compartments, said block having a first passage connecting one of said grooves with the upper compartment, said block having a second passage connecting the other of said grooves with the exterior of the block, said means being operative to stress said membrane for enlarging the lower compartment while diminishing the upper compartment, said outer edge of the membrane being pivotable by said means outwardly on said rim to effect a hermetic seal under suction of the lower compartment on said flat support, said rings being forced outwardly to press against said flat support by air pressure applied from the diminished upper compartment and by outside air pressure respectively to provide further hermetic seal on said support.

8. A pneumatic holding device, comprising a block having a rigid flat bottom surface for contacting a flat support, said block having a cylindrical cavity therein open at the bottom of the block, said cavity having a wall undercut to form a recess with an inner circular corner rim, said block having a plurality of grooves open at the bottom of the block and surrounding said recess, a pair of resilient rings retained respectively in two of said grooves and normally spaced inwardly from the bottom of the block, a stiffly resilient membrane extending across the cavity and having its outer edge normally supported in said recess adjacent said rim to divide the cavity into first and second compartments, a flexible partition extending across the recess adjacent the membrane to form a wall of a third compartment in the recess, means supporting said membrane in an unstressed condition away from the bottom of the block in said recess, said block having three passages formed therein, a first one of the passages connecting one of said two grooves with the third compartment, a second one of said passages connecting the other of said two grooves with the exterior of the block, the third one of said passages connecting the second compartment with a third one of the grooves, said means being operative to stress said membrane and partition for enlarging the first compartment while diminishing the second and third compartments, said outer edge of the membrane being pivotable by said means outwardly on said rim to effect a hermetic seal of the first compartment on said flat support, said rings normally sealing the rings against flow of air from said passages past the rings, said rings being forced outwardly to press against said flat support by air pressure applied from the diminished third compartments and by outside air pressure respectively.

9. A pneumatic device according to claim 7, further comprising a valve connected to said block and opening into said third compartment, said valve providing a one way flow of air out of said third compartment to the exterior of the block.

10. A pneumatic holding device for a gauge, tool or the like, comprising a block having a rigid flat bottom surface for contacting a flat support, said block having a cylindrical cavity therein open at the bottom of the block, said cavity having a wall undercut to form a recess with an inner circular corner rim, said block having an endless groove open at the bottom of the block and surrounding said recess, a resilient ring retained in said groove and sealing the groove against flow of air past the ring, said ring being normally spaced inwardly from the bottom of the block, a stiffly resilient membrane extending across the cavity and having its outer edge normally supported in said recess adjacent said rim, means supporting said membrane in an unstressed condition away from the bottom of the block in said recess to divide the cavity into upper and lower compartments, said block having a passage formed therein connecting said groove with the upper compartment, and means operatively connected to stress said membrane for enlarging the lower compartment while diminishing the upper compartment, said outer edge of the membrane being pivotable outwardly on said corner rim to effect a hermetic seal under suction of the lower compartment on said flat support, said ring being forced outwardly to press against said flat support by pressure of air applied from the diminished upper compartment through said passage to effect a further seal on said support.

References Cited in the file of this patent

UNITED STATES PATENTS

| | | |
|---|---|---|
| 276,336 | Baumeister | Apr. 24, 1883 |
| 355,021 | Lang | Dec. 28, 1886 |
| 371,281 | Seimang | Oct. 11, 1887 |
| 881,899 | Chapman | Mar. 17, 1908 |
| 897,060 | Cash | Aug. 25, 1908 |
| 1,006,315 | Toth | Oct. 17, 1911 |
| 1,426,930 | Waldron | Aug. 22, 1922 |
| 1,840,400 | Lebherz | Jan. 12, 1932 |
| 2,042,372 | Watson | May 26, 1936 |
| 2,147,907 | MacChesney | Feb. 21, 1939 |
| 2,311,525 | Ebbs | Feb. 16, 1943 |
| 2,523,157 | Somma | Sept. 19, 1950 |
| 2,565,793 | Weismantel | Aug. 28, 1951 |
| 2,637,589 | Shultz et al. | May 5, 1953 |
| 2,742,251 | Udvardy | Apr. 17, 1956 |
| 2,815,240 | Lytle | Dec. 3, 1957 |